United States Patent
Izawa et al.

(10) Patent No.: US 9,346,235 B2
(45) Date of Patent: May 24, 2016

(54) METHOD OF HALF-CUT CUTOUT PROCESSING OF LABEL PAPER

(71) Applicants: Hideo Izawa, Narashino (JP); Reishi Fujiwara, Daisen (JP); Akira Ishikawa, Narashino (JP)

(72) Inventors: Hideo Izawa, Narashino (JP); Reishi Fujiwara, Daisen (JP); Akira Ishikawa, Narashino (JP)

(73) Assignee: MIYAKOSHI PRINTING MACHINERY CO., LTD., Narashino-shi (JP)

( * ) Notice: Subject to any disclaimer, the term of this patent is extended or adjusted under 35 U.S.C. 154(b) by 458 days.

(21) Appl. No.: 13/946,515

(22) Filed: Jul. 19, 2013

(65) Prior Publication Data

US 2014/0031189 A1    Jan. 30, 2014

(30) Foreign Application Priority Data

Jul. 30, 2012  (JP) .................................. 2012-167889

(51) Int. Cl.
*B31D 1/02* (2006.01)
*B23K 26/18* (2006.01)
(Continued)

(52) U.S. Cl.
CPC ............ *B31D 1/026* (2013.01); *B23K 26/0846* (2013.01); *B23K 26/18* (2013.01); *B23K 26/359* (2015.10); *B23K 26/38* (2013.01); *B23K 26/40* (2013.01); *B23K 26/402* (2013.01); *B31D 1/02* (2013.01); *B31D 1/021* (2013.01); *B31D 1/027* (2013.01); *B41J 3/4075* (2013.01); *B41J 11/663* (2013.01); *B41J 11/666* (2013.01); *B23K 2203/40* (2015.10); *B23K 2203/50* (2015.10)

(58) Field of Classification Search
CPC .......... B31D 1/02; B31D 1/026; B31D 1/027; B23K 26/18; B23K 26/352; B23K 26/359; B23K 26/40
USPC ...................... 219/121.72; 101/226; 400/621; 250/492.1; 493/324
See application file for complete search history.

(56) References Cited

U.S. PATENT DOCUMENTS 7,891,564 B2 *   2/2011   Ito .......................... B41J 3/4075
                                                            235/383
8,008,597 B2 *   8/2011   Watanabe .......... B23K 26/0846
                                                            219/121.67

(Continued)

FOREIGN PATENT DOCUMENTS

CN    1449331 A    10/2003
CN    1697733 A    11/2005

(Continued)

OTHER PUBLICATIONS

Extended European Search Report dated Dec. 6, 2013, issued in European Patent Application No. 13178140.3 (3 pages).

(Continued)

*Primary Examiner* — Samuel M Heinrich
(74) *Attorney, Agent, or Firm* — Westerman, Hattori, Daniels & Adrian, LLP

(57) ABSTRACT

A method of half-cut cutout processing of label paper 1 is disclosed that allows laser beam 11 to cut a label sheet 3 of the label paper 1 into a given cutout shape without damaging a supporting sheet 2.
In the method, a cutting locus 30 along contours of the cutout shape is printed on a surface of the label sheet 3 in a single color which is darker than or equal in darkness to a color that is the darkest of colors in portions to be cut, and then the cutting locus 30 printed is irradiated with the laser beam, thereby cutting the label sheet 3 selectively into the cutout shape.

7 Claims, 3 Drawing Sheets

(51) Int. Cl.
  *B23K 26/359* (2014.01)
  *B23K 26/08* (2014.01)
  *B23K 26/38* (2014.01)
  *B41J 3/407* (2006.01)
  *B41J 11/66* (2006.01)
  *B23K 26/40* (2014.01)

(56) References Cited

U.S. PATENT DOCUMENTS

| | | |
|---|---|---|
| 2005/0158107 A1 | 7/2005 | Acher |
| 2010/0073412 A1 | 3/2010 | Kaieda et al. |

FOREIGN PATENT DOCUMENTS

| | | |
|---|---|---|
| CN | 101223568 A | 7/2008 |
| JP | 2000-231335 A | 8/2000 |
| WO | 97/11841 A1 | 4/1997 |
| WO | WO97/11841 * | 4/1997 |
| WO | 02/18142 A1 | 3/2002 |
| WO | 2004/069542 A1 | 8/2004 |
| WO | 2006/108269 A1 | 10/2006 |

OTHER PUBLICATIONS

Chinese Office Action dated Dec. 29, 2015 issued in counterpart Chinese Patent Application No. 201310322466.9, (5 pages).

* cited by examiner

METHOD OF HALF-CUT CUTOUT PROCESSING OF LABEL PAPER

BACKGROUND OF THE INVENTION

1. Technical Field

The present invention relates to a method of half-cut cutout processing of label paper, which allows laser beam to cut only a label sheet of the label paper into a given cutout shape.

2. Background Art

A variety of label paper has hitherto been proposed, the label paper comprising a label sheet and a supporting sheet stuck together with a pressure-sensitive adhesive wherein only the label sheet of the label paper is cut into given cutout shapes, each of which may individually be peeled off from the supporting sheet for use as a label or the like.

And, a variety of ways of half-cut cutout processing of label paper have also be proposed that allows laser beam to cut only a label sheet of the label paper.

For example, as disclosed in JP 2000-231335 A, a method of half-cut cutout processing of label paper has been proposed in which the label paper has a label sheet (main film) and a supporting sheet (base film) stuck together with a pressure-sensitive adhesive and surface of the label sheet is irradiated with laser beam (laser light ray) and thereby only the label sheet of the label paper is cut into given cutout shapes.

A depth of cut into a surface of a label sheet irradiated with laser beam as mentioned above is determined by a processing energy of the laser beam and a color of the surface of the label sheet.

To wit, the larger and smaller the processing energy of the laser beam becomes, the greater and smaller the depth of cut becomes, respectively. And, the darker and brighter the color of the label sheet surface becomes, the higher and lower the absorption efficiency of the laser beam becomes, hence the greater and smaller the depth of cut becomes, respectively.

A processing energy of laser beam is determined by an output, an irradiation time and an irradiation density of the laser beam.

On the other hand, on a surface of the label sheet there is printed a print image such as of a character and a figure, which has been printed before cutting of the label sheet.

And, there are both the case where cutting is effected over a region not of the printed image (e.g., a blank portion outside of the periphery of the printed image) and the case where cutting is effected over a region of the printed image (e.g. a portion in the printed image which is closer to its periphery when it is printed all over the surface) and also the case where cutting is effected over both a region not of the printed image and a region of the printed image. In any of the cases, it is required that a depth of cut correspond to a thickness of the label sheet so as not to cause the supporting sheet to be damaged by the laser beam.

Thus, in the case where cutting is effected in a region not of a printed image on the label sheet, the requirement for a processing energy of the laser beam corresponding to a color in a surface of the label sheet will, when label sheets of different surface colors are to be cut, require that the processing energy of laser beam be adjusted and controlled for each of the label sheets of different surface colors, making the cutting operations complicated and burdensome.

Also, in the case where cutting is effected in a region of a printed image on the label sheet, a requirement for the printed image having a plurality of portions of different colors will require that the processing energy of laser beam be frequently adjusted and controlled in cutting each of different printed color portions, namely during each cutting operation, rendering the operation highly complicated and burdensome.

Also in the case where cutting is effected over both a region of and a region not of a printed image, it is required that the processing energy be adjusted and controlled as in both the cases mentioned above, making the cutting operations very complicated and burdensome.

Made in view of the aforementioned problems, the present invention has for its object to provide an improved method of half-cut cutout processing of label paper which allows a label sheet to be cut by laser beam without damaging a supporting sheet and which is simple in adjustment and control of a processing energy of the laser beam, reducing the burdensomeness of the cutting operation and operations.

DISCLOSURE OF THE INVENTION

In order to achieve the object mentioned above, there is provided in accordance with the present invention a method of half-cut cutout processing of label paper which allows laser beam to cut a label sheet of the label paper into a given cutout shape, wherein the method comprises: printing a cutting locus along contours of the cutout shape on a surface of the label sheet, in a single color that is darker than or equal in darkness to a color which is the darkest of colors in portions to be cut; and irradiating with laser beam, and thereby cutting, the cutting locus so printed.

In the method of the present invention, when the cutting locus is printed in a region not of a print image on the label sheet of label paper, the cutting locus is preferably printed in a single color that is darker than or equal in darkness to a color which is the darkest of colors of the surface of the label sheet of label paper.

In the method of the present invention, when the cutting locus is printed in a region of a print image on the label sheet of label paper, the cutting locus is preferably printed in a single color that is darker than or equal in darkness to a color which is the darkest of colors of the print image on the label sheet of label paper.

In the method of the present invention, the cutting locus is preferably printed continuously having an identical width and using ink of a type that is identical to that of ink used in having the print image printed on the label sheet of label paper, and the width of the cutting locus is smaller than a spot diameter of the laser beam with which the cutting locus is irradiated.

These features of the invention allow simply choosing a color in which to print a cutting locus and eliminates the need to prepare an exclusive ink.

Also, making the width of cutting locus smaller than the diameter of a spot of laser beam prevents the cutting locus from being residual on a label.

In the method of the present invention, the cutting locus is preferably printed in a single color of black.

This specific feature of the invention, whatsoever the case may be, allow holding the processing energy of laser beam constant at a reduced value to maintain the depth of cut at a selected value, thereby cutting a label sheet without damaging a supporting sheet.

In the method of the present invention, the laser beam with which the cutting locus is irradiated has preferably a value of processing energy set based on a thickness of the label sheet and a color of the cutting locus so that a depth of the cut corresponds to a thickness of the label sheet.

In the method of the present invention, the laser beam preferably has a processing energy set at a value varied by controlling a scanning rate of the laser beam while maintaining an output thereof constant.

The present invention allows cutting a label sheet without damaging a supporting sheet and at the same time simplifying adjustment or control of the processing energy of laser beam and reducing its burdensomeness to a minimum.

Also, reducing the processing energy of laser beam, the present invention permits reducing the processing cost and increasing the scanning rate with laser beam to effect processing efficiently.

Further, with the ability to make the supporting sheet thinner in thickness, the present invention allows reducing an amount of waste of products left after use or removal of label sheets therefrom.

BEST MODES FOR CARRYING OUT THE INVENTION

Figure 1:
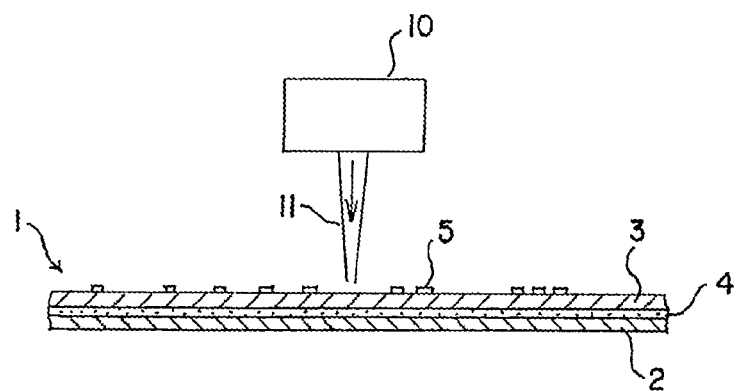
FIG. 1 is a cross sectional view of a label paper.

FIG. 1 shows label paper 1 which comprises a supporting sheet 2 and a label sheet 3 stuck together with a pressure-sensitive adhesive 4, the label sheet 3 having a print image 5 printed on a surface thereof.

The label paper 1 shown in FIG. 1, to facilitate its understanding, is illustrated with its thickness and the like varied from those of actual label paper.

The label sheet 3 of the label paper 1 is irradiated on its surface with a laser beam 11 by a laser processing apparatus 10, the laser beam 11 having its thermal energy to cut the label sheet 3 into a given cutout shape, thereby effecting half-cut cutout processing of the label paper 1.

Figure 2:
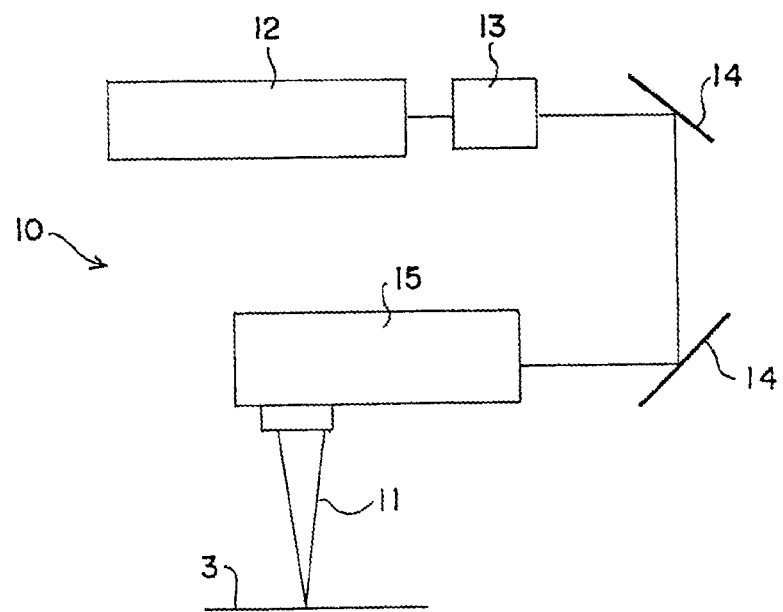
FIG. 2 is an explanatory view illustrating a laser beam processing apparatus.

The laser processing apparatus 10 as shown in FIG. 2 includes a laser oscillator 12 for generating laser beam from $CO_2$ or YAG, a beam expander 13 for amplifying the laser beam, reflecting mirrors 14, a galvanometer scanner 15 for scanning with the laser beam, a first controller (not shown) for controlling the output of the laser oscillator 12 and a second controller (not shown) for controlling the scanning rate with the laser beam. Surfaces of the label sheet 3 are scanned with the laser beam 11 by the galvanometer scanner 15 to cut the label sheet 3.

The laser processing apparatus 10 is not limited to that shown and described above but may be a laser processing apparatus 10 of one of various types known.

For example, it may be a laser processing apparatus consisting of a laser beam oscillator 12 and a galvanometer scanner 15.

It may be one having an optical lens for condensing a laser beam.

Figure 3:
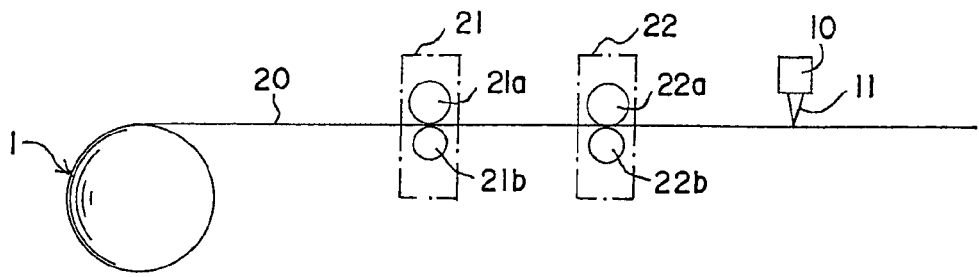
FIG. 3 is a general diagrammatic explanatory view illustrating half-cut cutout processing.

An apparatus, as shown in FIG. 3, for carrying out a processing method of the present invention may use a continuous web of paper constituting the label paper 1 and may comprise a conveyance path 20 along which the web of label paper 1 is conveyed, a first printing unit 21 for printing an image on a surface of the label sheet 3, a second printing unit 22 for printing a cutting locus along contours of a given cutout shape on a surface of the label sheet 3 and a laser processing apparatus 10 for irradiating the surface of the label sheet 3 with laser beam 11. These units and apparatus are so arranged that they are spaced apart from one another in the direction of conveyance of the label paper 1, i.e. so that the first printing unit 21 is positioned most upstream, the laser processing apparatus 10 most downstream and the second printing unit 22 intermediate between them.

The first printing unit 21 as shown includes a printing cylinder 21a and an impression cylinder 21b such that passing the label paper 1 through a nip portion between the printing cylinder 21a and the impression cylinder 21b allows a print image to be printed with printing ink on a surface of the label sheet 3.

The second printing unit 22 as shown includes a printing cylinder 22a and an impression cylinder 22b such that passing the label paper 1 through a nip portion between the printing cylinder 22a and the impression cylinder 22b allows a cutting locus as mentioned above to be printed on a surface of the label sheet 3 with ink that may be identical in type to the printing ink used in the first printing unit 21.

And, the label paper 1 having the print image and the cutting locus printed thereon is irradiated along the cutting locus with laser beam by the laser processing apparatus 10 to cut the label sheet 3 into a given cutout shape. To wit, the label paper 1 is cut as half-cut cutout processing.

A depth of the cut that ensues from irradiation with laser beam is determined by a processing energy of the laser beam.

A processing energy of laser beam is determined by an output, an irradiation time and an irradiation density of the laser beam from the laser oscillator 12.

And, an irradiation time of laser beam is varied with a scanning rate with the laser beam, and an irradiation density of laser beam is varied with a diameter of a spot of impingement by the laser beam on a surface to be processed.

In order to effect half-cut cutout processing of the label paper 1 using laser beam as mentioned above, it is important not to damage the supporting sheet 2 by ensuring that a value of depth of cut by the laser beam corresponds to a thickness of the label sheet 3. Hence, the depth of cut could be allowed to have a value corresponding to a thickness of the label sheet 3 by varying the processing energy of laser beam, i.e. by adjusting and controlling the output, the scanning rate and the irradiation time of laser beam in accordance with the thickness of the label sheet 3 and the color of surface of the label sheet 3.

A feature of the present invention resides in printing a cutting locus on a surface of the label sheet along contours of the given cutout shape and then irradiating the printed cutting locus with laser beam and thereby cutting only the label sheet.

The cutting locus is printed in a single color that is darker than or equal in darkness to a color which is the darkest of colors in contours of the cutout shape on a surface of the label sheet 3, i.e. portions to be cut therein whereby the depth of the cut that ensues from irradiating the cutting locus with laser beam of processing energy having no change and held constant is made identical all over portions of the contours of the cutout shape which portions may be of different colors.

Thus, in cutting the label sheet 3 with laser beam, the processing energy of laser beam is adjusted and controlled based on the color of the cutting locus and the thickness of the label sheet 3 to be cut, so that the depth of cut corresponds to the thickness of the label sheet 3, thereby permitting the label sheet 3 to be cut without damaging the supporting sheet, and making it unnecessary to adjust or control the processing energy of laser beam for each of label sheets 3 which are of different surface colors and also during a single operation of cutting a label sheet 3. Therefore, the operation of adjustment and control of the processing energy of laser beam is simplified and its burdensomeness is reduced to a minimum.

Also, cutting by irradiating a printed cutting locus 30 with laser beam makes excellent the accuracy in the depth of cut. And, it minimizes cutting of a supporting sheet 2 and causing an insufficient depth of cut.

Also, cutting a cutting locus 30 printed in dark color makes it possible to effect cutting in less processing energy than cutting a label sheet 3 having no such locust of cutting and thus to reduce the processing energy of laser beam required. Hence, it can reduce the cutting cost, reduce the output of laser beam and shorten the irradiation time. Further, since the irradiation time period can be shortened with the laser beam output not lowered but held constant, it is made possible to efficiently effect half-cut cutout processing of label paper with an increased scanning rate of laser beam.

It is noted that in actual cutting with laser beam to cut each of both straight and curved cutting portions, the output of the laser oscillator and the scanning rate are controlled and adjusted so that from a start point to an end point its motion is accelerated, uniform and decelerated. For a connecting portion (e.g. corner portion), the output of the laser oscillator and the scanning rate are controlled and adjusted so as to leave the width of cut unvaried, thus so as not to deteriorate the quality.

By cutting a label sheet 3 with laser beam as mentioned above, imparting no damage to a supporting sheet 2 makes it unnecessary to pretreat the surface of the supporting sheet 2 in order to prevent it from being affected by the laser beam.

Further, since the depth of cut by laser beam is made constant to correspond to the thickness of the label sheet 3, the supporting sheet 2 can be prevented from damaging due to a variation of the depth of cut. There is now no need to take a measure of thickening the supporting sheet 2 to an extent that the supporting sheet 2 is estimated to be cut but not broken or ruptured. Since the supporting sheet 2 can thus be made thinner, it is made possible to reduce the waste of paper left after use as a cut product.

Mention is now made of printing a cutting locus as mentioned above.

A cutting locus is continuously printed having an identical width.

A spot of laser beam irradiated on the cutting locus has a spot diameter (irradiation diameter) made constant.

The cutting locus has a width which is smaller than the spot diameter of laser beam irradiated on the cutting locus. The spot diameter of laser beam is preferably 0.2 mm to 0.3 mm.

It is thus ensured that the cutting locus irradiated with laser beam is cut (burned up) over its full width, leaving no residual, and consequently that a label cutout is prevented from seeming unsightly due to a cutting locus that may otherwise be partially left.

The cutting locus may be printed with ink of the same type as used as ink with which the print image is printed on a surface of the label sheet 3.

This allows simply choosing an ink color darker than a color or colors used to print on the surface of the label sheet and eliminates the need to prepare an exclusive ink.

Mention is next made of a specific embodiment of printing a cutting locus.

Figure 4:
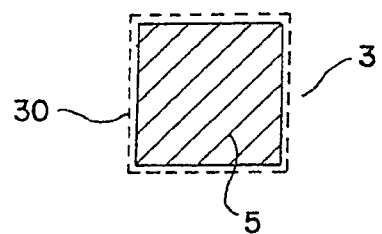
FIG. 4 is an explanatory view illustrating a cutting locus.

As shown in FIG. 4, after a print image 5 is printed by the first printing unit 21 on the surface of the label sheet 3, a cutting locus 30 may be printed by the second printing unit 22, in a region not of the printed image 5 (a blank area surrounding the printed image 5) on the surface of the label sheet 3, in a single color that is darker than or equal in darkness to a color on the surface of the label sheet 3 and with ink of the type same as that of ink used in printing the print image 5.

When a plurality of types of label paper are selected, used and printed on, whose surfaces of label sheets 3 are different in color, a surface color of the darkest label sheet 3 of those types of label paper is selected as a reference, on the basis of which a cutting locus 30 is printed using ink as mentioned above, in a single color that is darker than or equal in darkness to the darkest surface color.

This ensures that if any of those label sheets 3 which are different in surface color is used, the label sheet 3 can be cut without damaging a supporting sheet 2, by irradiating the cutting locus 30 with laser beam whose processing energy is adjusted based on a thickness of the label sheet 3 and the color of the cutting locus 30.

Figure 5:
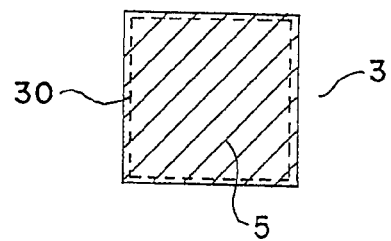
FIG. 5 is an explanatory view illustrating a cutting locus.

As shown in FIG. 5, when a cutting locus 30 is printed in a region of the printed image 5 on a surface of the label sheet 3 (e.g. in the case of overall printing), the darkest color of different colors of the printed image 5 is selected as a reference, on the basis of which the cutting locus is printed using ink as mentioned above, in a single color that is darker than or equal in darkness to the darkest print color.

This ensures that the label sheet 3 can be cut without damaging a supporting sheet 2, by irradiating the cutting locus 30 with laser beam whose processing energy is adjusted corresponding to the thickness of the label sheet 3 and the printing color of the cutting locus 30.

Also, in this case that the cutting locus 30 is placed in the region of the printed image 5, its registering relative to the latter is visionally relaxed, making it possible to raise the line speed (scanning rate).

When within a plurality of printed images 5 there are printed a corresponding number of cutting loci 30, respectively, the darkest print color of colors in each of the printed images is selected as a reference and cutting loci 30 are printed in the printed images, respectively, in a single color that is darker than or equal in darkness to the darkest print color or colors.

When a plurality of label paper 1 is sequentially cut as half-cut cutout processing, the darkest print color of colors in the print image 5 on the label sheet 3 of each label paper 1 is selected as a reference and cutting loci 30 are printed in regions of the print images, respectively, in a single color that is darker than or equal in darkness to the darkest print color or colors.

Figure 6:
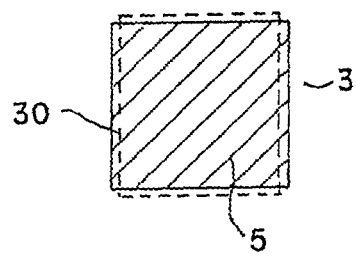
FIG. 6 is an explanatory view illustrating a cutting locus.

When a cutting locus 30 is printed over a region of the print image 5 and a region not of the print image 5 as shown in FIG. 6, the darkest print color of print colors in the regions is selected as a reference and the cutting locus 30 is printed in a single color that is darker than or equal in darkness to the darkest print color.

Figure 7:
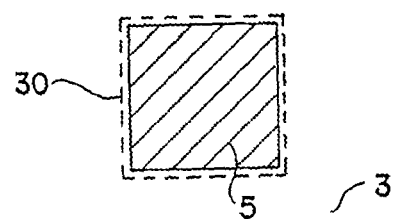
FIG. 7 is an explanatory view illustrating a cutting locus.
Figure 7:
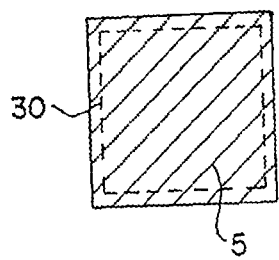

As shown in FIG. 7, when a plurality of print images 5 are printed on a label sheet 3 and cutting loci 30 are printed in a blank portion or portions each surrounding a print image 5 and in a region or regions of the other print image or images 5, respectively (e.g. cutting loci 30 which are identical in size are printed for print images 5 which are different in size), the darkest print color for each of the print images is selected as a reference and cutting loci are printed in a color that is darker than or equal in darkness to the darkest print color or colors.

The darkest color of surface colors of a label sheet 3 is black and the darkest color of print colors of an image 5 is black, too. Hence, a cutting locus can be printed with ink of black color in meeting with requirements of all the cases mentioned above.

Further, it is possible to deduce the processing energy of laser beam required to a minimum.

In FIG. 3, the first printing unit 21 and the second printing unit 22, both disposed upstream of the laser processing apparatus 10, for printing an image and a cutting locus, respectively, are shown each to be a rotary press using a printing and an impression cylinder. In order to more readily meet with variable printing and processing requirements, however, they may each be a digital printer such as ink jet printer or electrophotographic printer.

What is claimed is:

1. A method of half-cut cutout processing of label paper which allows laser beam to cut a label sheet of the label paper into a given cutout shape, characterized in that the method comprises:

printing a cutting locus along contours of said cutout shape on a surface of said label sheet, in a single color that is darker than or equal in darkness to a color which is the darkest of colors in portions to be cut; and irradiating with laser beam, and thereby cutting, the cutting locus so printed.

2. A method of half-cut cutout processing of label paper as set forth in claim 1, characterized in that when said cutting locus is printed in a region not of a print image on said label sheet of label paper, said cutting locus is printed in a single color that is darker than or equal in darkness to a color which is the darkest of colors of the surface of said label sheet of label paper.

3. A method of half-cut cutout processing of label paper as set forth in claim 1, characterized in that when said cutting locus is printed in a region of a print image on said label sheet of label paper, said cutting locus is printed in a single color that is darker than or equal in darkness to a color which is the darkest of colors of said print image on the label sheet of label paper.

4. A method of half-cut cutout processing of label paper as set forth in claim 1, characterized in that:

said cutting locus is continuously printed having an identical width and using ink of a type that is identical to that of ink used in having said print image printed on the label sheet of label paper; and the width of said cutting locus is smaller than a spot diameter of said laser beam with which the cutting locus is irradiated.

5. A method of half-cut cutout processing of label paper as set forth in claim 1, characterized in that said cutting locus is printed in a single color of black.

6. A method of half-cut cutout processing of label paper as set forth in claim 1, characterized in that the laser beam with which the cutting locus is irradiated has a value of processing energy set based on a thickness of the label sheet and a color of the cutting locus so that a depth of cut corresponds to a thickness of the label sheet.

7. A method of half-cut cutout processing of label paper as set forth in claim 6, characterized in that said laser beam has a processing energy set at a value varied by controlling a scanning rate of the laser beam while maintaining an output thereof constant.

* * * * *